United States Patent
Rahman et al.

(10) Patent No.: US 10,020,267 B2
(45) Date of Patent: Jul. 10, 2018

(54) 2.5D ELECTRONIC PACKAGE

(71) Applicant: Altera Corporation, San Jose, CA (US)

(72) Inventors: Arifur Rahman, San Jose, CA (US); Karthik Chandrasekar, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 15/412,535

(22) Filed: Jan. 23, 2017

(65) Prior Publication Data

US 2017/0133329 A1  May 11, 2017

Related U.S. Application Data

(60) Division of application No. 14/538,646, filed on Nov. 11, 2014, now Pat. No. 9,583,431, which is a continuation-in-part of application No. 13/687,695, filed on Nov. 28, 2012, now Pat. No. 8,901,961.

(51) Int. Cl.
*H01L 23/52* (2006.01)
*H01L 23/00* (2006.01)
*G06F 17/50* (2006.01)
*H01L 21/48* (2006.01)
*H01L 23/498* (2006.01)

(52) U.S. Cl.
CPC ........ *H01L 23/562* (2013.01); *G06F 17/5081* (2013.01); *H01L 21/486* (2013.01); *H01L 21/4853* (2013.01); *H01L 21/4857* (2013.01); *H01L 23/49822* (2013.01); *H01L 23/49827* (2013.01); *H01L 23/49838* (2013.01); *H01L 24/16* (2013.01); *G06F 2217/08* (2013.01); *G06F 2217/40* (2013.01); *G06F 2217/78* (2013.01); *G06F 2217/80* (2013.01); *G06F 2217/82* (2013.01); *G06F 2217/84* (2013.01); *H01L 2224/16227* (2013.01)

(58) Field of Classification Search
None
See application file for complete search history.

*Primary Examiner* — Calvin Choi

(57) ABSTRACT

A 2.5D electronic package is provided in which at least one integrated circuit is mounted on an interposer that is mounted on a package substrate. To reduce warpage, the interconnection array of the integrated circuit does not include a thick metallization layer; and at least part of the power distribution function that would otherwise have been performed by the thick metallization layer is performed by one or more metallization layers that are added to the interposer. A method is provided for optimizing the design of the electronic package by choosing the appropriate number of metallization layers to be added to the interposer.

14 Claims, 3 Drawing Sheets

2.5D ELECTRONIC PACKAGE

CROSS-REFERENCE TO RELATED APPLICATIONS

This application is a divisional of U.S. patent application Ser. No. 14/538,646, filed Nov. 11, 2014, which is a continuation-in-part of U.S. patent application Ser. No. 13/687,695, filed Nov. 28, 2012, both of which are incorporated by reference herein in their entireties.

BACKGROUND

The present invention relates generally to an electronic package for one or more integrated circuits and to a method for designing the package. An integrated circuit includes a large number of circuit elements such as transistors formed in a semiconductor substrate and an interconnection array defined in alternating layers of an insulating material and a conducting material formed on top of the circuit elements. Illustratively, in state of the art integrated circuits, interconnection paths may be defined in twelve or more layers of conducting material to provide signal, power and ground connections to the circuit elements. The side of the semiconductor substrate with the circuit elements and interconnection array is often referred to as the front side or the active side. The opposite side of the substrate is referred to as the back side.

It frequently is desirable to mount an integrated circuit on another surface. To ensure good contact between the integrated circuit and the other surface, it is critical that the two joining surfaces be substantially parallel at the joining temperature. Illustratively, the surfaces are joined by two dimensional arrays of solder balls or solder bumps that are typically copper.

Warpage of the integrated circuit that causes non-parallel bonding surfaces is a constant concern in semiconductor fabrication. One example of a warpage problem is that caused by use of thick metal layers in power distribution networks in the interconnection array on an integrated circuit. In this example which is summarized in Table I below, several integrated circuit wafers are fabricated at a 20 nanometer (nm.) technology node using twelve metal layers, the uppermost of which is approximately three times the thickness of most of the underlying layers. The wafers are identified in column A. The warpage in microns of the wafers before formation of the uppermost metallization layer is set forth in column B and the warpage of the wafers after formation of the uppermost layer is set forth in column C. As can be seen, the uppermost layer changes the warpage of each wafer from a positive warpage of approximately 30 microns ($\mu$) where a positive warpage indicates a concave shape on the front side of the substrate to a negative warpage of approximately 150 where a negative warpage indicates a convex shape. These large negative numbers are not acceptable.

TABLE I

| COLUMN A | COLUMN B | COLUMN C |
|---|---|---|
| 1 | 27.3 | −177.1 |
| 2 | 35.9 | −157.2 |
| 3 | 32.8 | −140.4 |
| 4 | 34.3 | −149.9 |
| 5 | 35.4 | −143.5 |
| 6 | 37.7 | −137.6 |

As a general rule, warpage tends to increase with increasing die size. As a result, a stack of metal layers used on a small die may not produce excessive warpage while the same stack of metal layers used on a larger die may produce excessive warpage.

SUMMARY

In a preferred embodiment of the invention, a 2.5D electronic package is provided in which at least one integrated circuit is mounted on an interposer that is mounted on a package substrate. A 2.5D electronic package is intermediate a 3D package in which multiple integrated circuits are stacked one-on-top-of-the-other on a package substrate and conventional packaging in which a single integrated circuit is mounted on the package substrate. In 2.5D packages, multiple integrated circuits are mounted side-by-side on an interposer which provides connections between the integrated circuits; and the interposer is mounted on the package substrate.

To reduce warpage, in a preferred embodiment, the interconnection array of the integrated circuit does not include a thick metallization layer; and at least part of the power distribution function that would otherwise have been performed by the thick metallization layer is performed by one or more metallization layers that are added to the interposer. Illustratively, the interposer is a thin, flat substrate approximately 100 microns or less thick that is made of silicon with a plurality of metallization layers on one or both major surfaces. The interposer is connected to the integrated circuit by an array of micro bumps; and it is connected to the package substrate by an array of C4 bumps.

A method is also provided for optimizing the design of the electronic package by choosing the appropriate number of metallization layers to be added to the interposer.

Numerous variations may be practiced in the preferred embodiment.

BRIEF DESCRIPTION OF THE DRAWINGS

These and other objects and advantages of the present invention will be apparent to those of ordinary skill in the art in view of the following detailed description in which.

DETAILED DESCRIPTION

Figure 1:
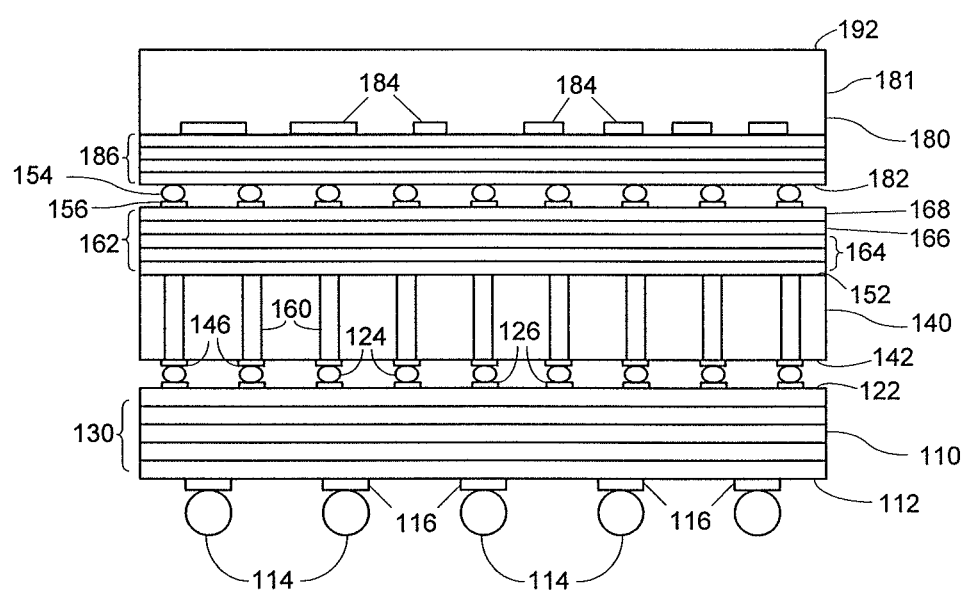
FIG. 1 is a schematic view of a first illustrative embodiment of the invention.

FIG. 1 is a schematic view of a first illustrative embodiment 100 of the invention. Embodiment 100 comprises a package substrate 110, an interposer 140, and an integrated circuit 180. Package substrate has first and second major surfaces 112, 122. A ball grid array 114 mounted on pads 116 on surface 112 provides signal, power, and ground connections between a circuit board or the like (not shown) and pads 116. Pads 116 on surface 112 are electrically connected to pads 126 on surface 122 by layers of metallization 130 that extend through substrate 110 as is known in the art. An array 124 of C4 bumps mounted on pads 126 provides signal, power, and ground connections between substrate 110 and interposer 140.

Interposer 140 has first and second major surfaces 142, 152. As described above, signal, power, and ground connections between substrate 110 and interposer 140 are provided by array 124 of C4 bumps. The bumps are connected to pads 146 on surface 142. Pads 146 on surface 142 are electrically connected to pads 156 on surface 152 by vias 160 that extend through interposer 140 and layers of metallization 162. Illustratively, an array 154 of micro bumps mounted on pads 156 provides signal, power, and ground connections between interposer 140 and integrated circuit 180.

Interposer 140 is typically made of silicon and vias 160 are conventional through silicon vias (TSVs) made by etching holes into the silicon from one surface. Typically, the holes are about 10μ in diameter and extend about 100μ into the silicon substrate. The holes are completed by polishing the other surface of the silicon until the thickness of the silicon substrate is reduced to the depth of the holes. The holes are then filed by a suitable conducting material such as copper or tungsten.

Metallization layers 162 typically include two or three layers 164 of a metal such as copper and at least one other layer 166 of a metal such as aluminum. The primary function of these layers is to provide connectivity among the various integrated circuits that are mounted on the interposer. In accordance with the invention, metallization layers 162 also include at least one additional layer 168 whose function is to provide for power distribution in integrated circuit 180. As shown in FIG. 1, metallization layers 162 are on one side of interposer 140, illustratively, surface 142.

Integrated circuit 180 may be any integrated circuit. It has first and second major surfaces 182, 192. As is known in the art, it includes a large number of circuit elements 184 such as transistors formed in a semiconductor substrate 181 and an interconnection array 186 defined in alternating layers of an insulating material and a conducting material formed on top of the circuit elements. Illustratively, in state of the art integrated circuits, interconnection paths may be defined in twelve or more layers of conducting material to provide signal, power and ground connections to the circuit elements. The side of the semiconductor substrate with the circuit elements and interconnection array is often referred to as the front side or the active side. In FIG. 1, this side is surface 182. The opposite side of the substrate is referred to as the back side and is surface 192 in FIG. 1. As will be recognized by those skilled in the art, integrated circuit 180 is mounted on interposer 140 in a so-called "flip-chip" position with its active surface facing the interposer.

In accordance with the invention, the number and/or thickness of the layers of conducting material are controlled to minimize warpage of the integrated circuit. In particular, unlike some circuit designs in which the uppermost conducting layer is substantially thicker than the other conducting layers so as to provide for power distribution, the uppermost layer in integrated circuit 180 is no thicker than any other conducting layer in interconnection array 186. As a result, the interconnection array does not have sufficient power distribution capability as can be determined by an increased IR drop compared to what would be observed if the uppermost conducting layer were thicker. As noted above, one or more additional conducting layers are added to the interposer to provide for power distribution on the integrated circuit.

Figure 2:
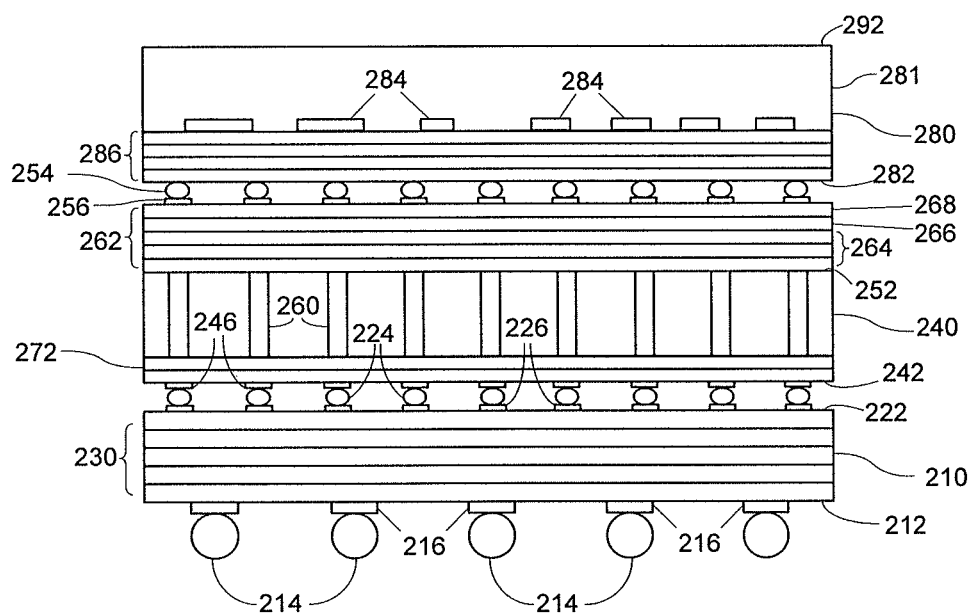
FIG. 2 is a schematic view of a second illustrative embodiment of the invention.

FIG. 2 is a schematic view of a second illustrative embodiment 200 of the invention. Embodiment 200 is similar to embodiment 100 except that the interposer has a plurality of metal layers on each major surface of the interposer. Embodiment 200 comprises a package substrate 210, an interposer 240, and an integrated circuit 280. Package substrate 210 and integrated circuit 280 have the same elements as package 110 and these elements bear the same element numbers increased by 100.

Interposer 240 has many of the same elements as interposer 140 and these bear the same element numbers increased by 100. Interposer 240 also has additional layers 272 of metallization formed on the first major surface 242 of the interposer.

As in the case of embodiment 100, the number and/or thickness of the layers of conducting material in embodiment 200 are controlled to minimize warpage of integrated circuit 280. In particular, unlike some circuit designs in which the uppermost conducting layer is substantially thicker than the other conducting layers so as to provide for power distribution, the uppermost layer in integrated circuit 280 is no thicker than any other conducting layer in interconnection array 286. As a result, the interconnection array does not have sufficient power distribution capability as can be determined by an increased IR drop compared to what would be observed if the uppermost conducting layer were thicker. One or more additional conducting layers 268, 272 are added to the interposer to provide for power distribution on integrated circuit 280.

Figure 3:
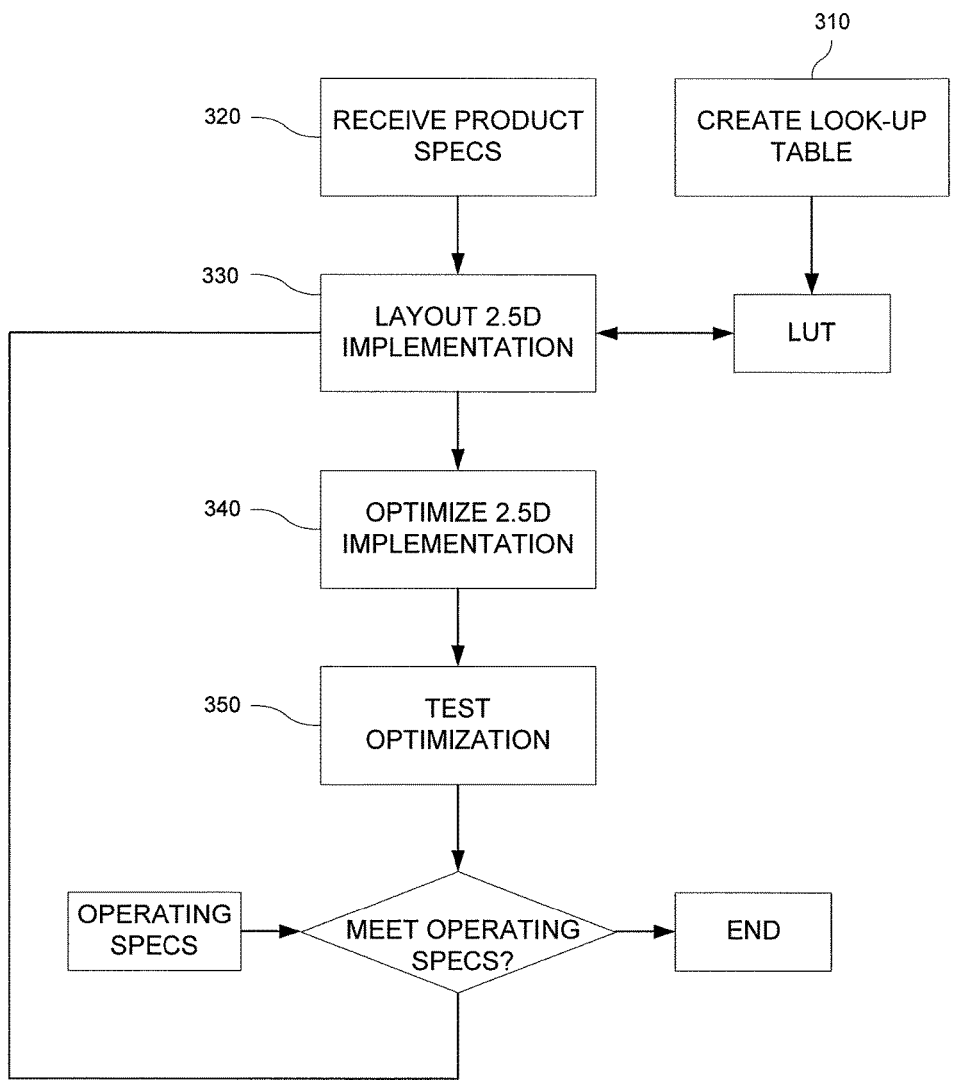
FIG. 3 is a flowchart depicting an illustrative method for practicing the invention.

The optimum number of conducting layers to be added to the interposer to compensate for the lack of a thick uppermost conducting layer on the integrated circuit depends on a variety of factors since these changes affect not only power distribution but also circuit timing, signal/power integrity, and thermal analysis, to name a few considerations. FIG. 3 is flowchart of an illustrative method of practicing the invention to optimize this package re-design.

The process begins at step 310 with the creation of a look-up table that specifies a plurality of partitioning options for the interconnects that connect the integrated circuit, the interposer and the package substrate. Illustratively, these options include different numbers of conducting layers on the integrated circuit, different numbers of conducting layers on the interposer, different thicknesses of the layers, and whether these layers are on one or both sides of the interposer.

At step 320 a set of product specifications is received that specifies the product in sufficient detail to permit placing and routing of circuits and the determination of their power and timing requirements.

At step 330, conventional placing and routing algorithms are used to layout a 2.5D implementation of the electronic package using the product specifications and one or more of the partitioning options specified in the look-up table formed at step 310. Illustratively, this process is an iterative process in which different partitioning options are successively tried until one is found that provides a 2.5D implementation that meets threshold requirements.

Optionally, as part of this process, a determination is made whether the area of the integrated circuit die exceeds a predetermined threshold sufficient to warrant the use of a 2.5D implementation of the electronic package. If the die area does not reach the threshold, the electronic package is laid out using conventional processes.

At step 340, the 2.5D implementation identified at step 330 is then optimized. These optimizations may include accepting a higher IR drop in return for more favorable signal/power integrity in the circuits. Or they may include the use of dummy metal fill to maximize usage of one or more interconnect layers in the integrated circuit or the interposer. Or they may include circuit modifications to take advantage of the operating characteristics of a particular type of integrated circuit such as a field programmable gate array (FPGA) or a DRAM chip.

Simulations of the design that results from the optimization of step 340 are then tested at step 350. These tests may include tests relating to operating specifications such as timing, reliability, thermal analysis and signal power integrity.

Finally, at step 360, a determination is made whether the design meets the operating specifications or not. If it does not, the process returns to step 330 where another partitioning is taken up and placing and routing algorithms are used to layout a 2.5D implementation of the desired circuit.

As will be apparent to those skilled in the art, numerous variations may be practiced within the spirit and scope of the present invention.

What is claimed is:

1. A method comprising:
providing a package substrate having first and second major surfaces;
providing an integrated circuit having first and second major surfaces with a plurality of active devices in the integrated circuit, wherein the integrated circuit is mounted so that the first major surface of the integrated circuit faces the package substrate, wherein a plurality of interconnection layers and intermetallic dielectric layers are in the integrated circuit, and wherein an uppermost interconnect layer of the plurality of interconnection layers has a thickness no greater than that of any other one of the plurality of interconnection layers; and
providing an interposer between the integrated circuit and the package substrate with the integrated circuit mounted on the interposer, the interposer having at least one interconnection layer that is used primarily for power distribution in the integrated circuit, wherein the at least one interconnection layer in the interposer that is used primarily for power distribution in the integrated circuit extends across an entire width of the interposer.

2. The method of claim 1, wherein the interposer comprises a semiconductor material having first and second major surfaces and a plurality of conducting vias extending between the first and second major surfaces of the interposer.

3. The method of claim 2, wherein the plurality of interconnection layers in the integrated circuit are vertically stacked.

4. The method of claim 1, wherein the integrated circuit is made of silicon, and wherein the interposer is a thin layer of silicon having first and second major surfaces and a plurality of through-silicon-vias that provide conductive paths between the first and second major surfaces of the interposer.

5. The method of claim 4, wherein the interposer has a thickness that is about 100 microns or less, and the through-silicon-vias have a diameter that is about 10 microns or less.

6. The method of claim 1, wherein the integrated circuit is mounted on the interposer in flip-chip fashion.

7. The method of claim 1, wherein the interposer is a thin, flat substrate having first and second major surfaces with interconnection layers on both major surfaces.

8. A method comprising:
providing a package substrate having first and second major surfaces;
providing an integrated circuit having first and second major surfaces with a plurality of active devices in the integrated circuit, wherein the integrated circuit is mounted so that the first major surface of the integrated circuit faces the package substrate, wherein a plurality of interconnection layers and intermetallic dielectric layers are in the integrated circuit, and wherein an uppermost interconnect layer of the plurality of interconnection layers has a thickness no greater than that of any other one of the plurality of interconnection layers; and
providing an interposer between the integrated circuit and the package substrate with the integrated circuit mounted on the interposer, the interposer having at least one interconnection layer that is used primarily for power distribution in the integrated circuit, wherein the at least one interconnection layer in the interposer that is used primarily for power distribution in the integrated circuit is at least as wide as the integrated circuit.

9. The method of claim 8, wherein the interposer comprises a semiconductor material having first and second major surfaces and a plurality of conducting vias extending between the first and second major surfaces of the interposer.

10. The method of claim 9, wherein the plurality of interconnection layers in the integrated circuit are vertically stacked.

11. The method of claim 8, wherein the integrated circuit is made of silicon, and wherein the interposer is a thin layer of silicon having first and second major surfaces and a plurality of through-silicon-vias that provide conductive paths between the first and second major surfaces of the interposer.

12. The method of claim 11, wherein the interposer has a thickness that is about 100 microns or less and the through-silicon-vias have a diameter that is about 10 microns or less.

13. The method of claim 8, wherein the integrated circuit is mounted on the interposer in flip-chip fashion.

14. The method of claim 8, wherein the interposer is a thin, flat substrate having first and second major surfaces with interconnection layers on both major surfaces.

* * * * *